(12) United States Patent
Gaertner et al.

(10) Patent No.: US 11,047,802 B2
(45) Date of Patent: Jun. 29, 2021

(54) TUBE FURNACE DEVICE FOR AN ATOMIZING FURNACE

(71) Applicants: SCHUNK KOHLENSTOFFTECHNIK GMBH, Heuchelheim (DE); SHIMADZU CORPORATION, Kyoto (JP)

(72) Inventors: Ralf Gaertner, Lahnau (DE); Rudolf Weck, Sinn (DE); Akira Honda, Shiga (JP); Osuke Kobayashi, Kyoto (JP)

(73) Assignee: SCHUNK KOHLENSTOFFTECHNIK GMBH, Heuchelheim (DE)

( * ) Notice: Subject to any disclaimer, the term of this patent is extended or adjusted under 35 U.S.C. 154(b) by 3 days.

(21) Appl. No.: 16/494,821

(22) PCT Filed: Mar. 27, 2017

(86) PCT No.: PCT/EP2017/057224
§ 371 (c)(1),
(2) Date: Sep. 17, 2019

(87) PCT Pub. No.: WO2018/177504
PCT Pub. Date: Oct. 4, 2018

(65) Prior Publication Data
US 2020/0011804 A1    Jan. 9, 2020

(51) Int. Cl.
*G01J 3/30* (2006.01)
*G01N 21/74* (2006.01)
(Continued)

(52) U.S. Cl.
CPC ............ *G01N 21/74* (2013.01); *F27D 11/02* (2013.01); *G01N 21/3103* (2013.01)

(58) Field of Classification Search
CPC ...... G01N 21/74; G01N 21/3103; G01N 1/22; H05B 3/0014; G01J 3/42
(Continued)

(56) References Cited

U.S. PATENT DOCUMENTS

| 3,982,834 A | 9/1976 | Tamm |
| 4,647,200 A | 3/1987 | Widmer et al. |

(Continued)

FOREIGN PATENT DOCUMENTS

| CN | 201707292 U | 1/2011 |
| EP | 0377253 A2 | 7/1990 |

(Continued)

OTHER PUBLICATIONS

English machine translation of CN201707292.
(Continued)

*Primary Examiner* — Md M Rahman
(74) *Attorney, Agent, or Firm* — King & Schickli, PLLC

(57) ABSTRACT

The invention relates to a tube furnace device for an atomizing furnace and to an analyzing apparatus comprising an atomizing furnace and a tube furnace device, in particular for atomic absorption spectrometry, the tube furnace device comprising a sample carrier means (11) and a bearing means (12) for supporting and forming electrical contact with the sample carrier means, the sample carrier means having a receiving tube (16) forming a tubular receiving space (17) for receiving an analyte, the sample carrier means having two bearing protrusions on the receiving tube for forming a connection with the bearing means, the bearing protrusions extending perpendicularly, preferably orthogonally, in relation to a longitudinal axis of the receiving tube, wherein the tube furnace device has a contact pressure means (13) via which a contact pressure force (14) can be exerted on the bearing protrusions in the direction of a passant line (20) in relation to a circular cross section (21) of the receiving tube.

18 Claims, 4 Drawing Sheets

(51) Int. Cl.
*F27D 11/02* (2006.01)
*G01N 21/31* (2006.01)

(58) Field of Classification Search
USPC .......................................................... 356/312
See application file for complete search history.

(56) References Cited

U.S. PATENT DOCUMENTS

2003/0011766 A1   1/2003  Schlemmer et al.
2012/0178183 A1*  7/2012  Nolan .................. G01N 33/587
                                            436/501
2014/0118734 A1*  5/2014  Spivey ................. F27D 5/0068
                                            356/313

FOREIGN PATENT DOCUMENTS

| EP | 0604879 A1 | 7/1994 | |
| JP | S57131038 A | 8/1982 | |
| KR | 20090119736 A * | 11/2009 | ........... G01R 1/0466 |

OTHER PUBLICATIONS

English machine translation of EP0377253.
English machine translation of EP0604879.
English machine translation of JPS57131038A dated Aug. 13, 1982.

* cited by examiner

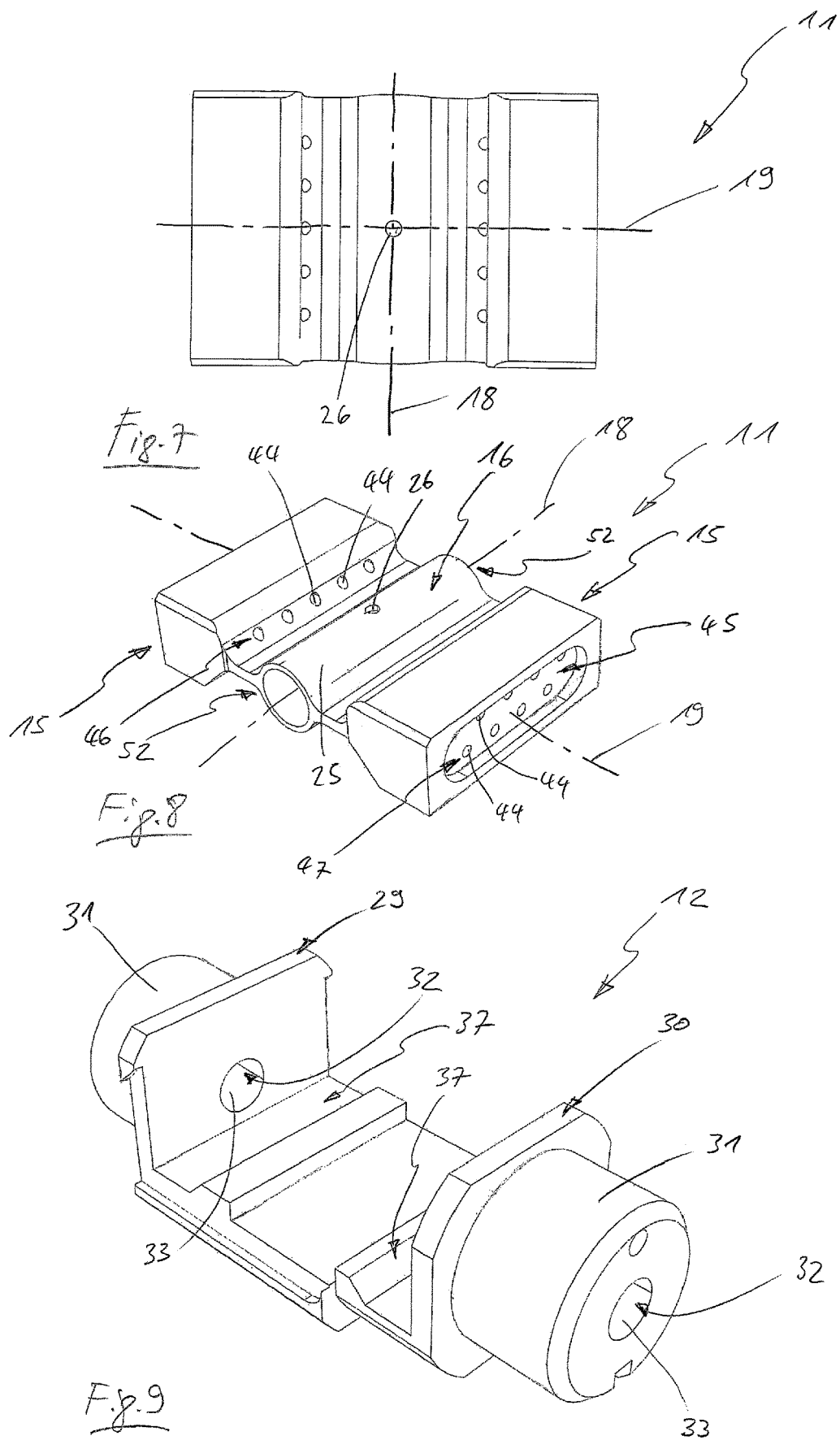

TUBE FURNACE DEVICE FOR AN ATOMIZING FURNACE

FIELD OF THE INVENTION

The invention relates to a tube furnace device for an atomizing furnace of an analyzing apparatus, in particular for atomic absorption spectrometry, the tube furnace device comprising a sample carrier means and a bearing means for supporting and forming electrical contact with the sample carrier means, the sample carrier means having a receiving tube forming a tubular receiving space for receiving an analyte, the sample carrier means having two bearing protrusions on the receiving tube for forming a connection with the bearing means, the bearing protrusions extending perpendicularly, preferably orthogonally, in relation to a longitudinal axis of the receiving tube.

BACKGROUND OF THE INVENTION

Atomizing furnaces for atomic absorption spectrometry (AAS), in particular for graphite-furnace atomic absorption spectrometry (GF-AAS), are well known, wherein a graphite furnace or a graphite tube is electro-thermally heated to atomize an analyte. The graphite furnace or a tube furnace device usually has a sample carrier means including a receiving space, which has a tubular design. Within the tubular receiving space, the analyte can be atomized directly within the receiving space or on a bowl-shaped platform within the receiving space, for example. For optical spectral analysis, the longitudinal ends of the tubular receiving space are always of an open design. The tubular receiving space is formed by a receiving tube of the sample carrier means made of graphite. The receiving space or the receiving tube can be longitudinally or transversally heated. That is, a heating current can flow from longitudinal ends of the receiving tube across a length of the receiving tube or the receiving tube can be provided with electrical contact via bearing protrusions located on opposite sides of its shell, so that a current flows through the receiving tube perpendicularly to its longitudinal axis. In this case, the bearing protrusions are supported and provided with electrical contact in a bearing means of the tube furnace device. Compared to longitudinal heating of the receiving tube, improved temperature consistency across an entire length of the receiving space can be achieved by transversal heating.

DESCRIPTION OF THE INVENTION

Depending on the configuration and on the manufacturer of an analyzing apparatus for atomic absorption spectrometry, different sample carrier means are known, which are adapted to the respective atomizing furnace. For instance, sample carrier means are known that are clamped with their bearing protrusions between bearing means of a tube furnace device. In this case, a clamping force is exerted, perpendicularly to a longitudinal axis of the receiving tube, on the sample carrier means or the bearing protrusions and thus on the receiving tube. At the same time, an electrically conductive contact is formed via the bearing means or via opposing bearing seats of the bearing means. Since the receiving tube is thus positioned between the bearing seats, the contact pressure force of the bearing seats is effected on the longitudinal axis of the receiving tube in the radial direction with respect to the receiving tube. Hence, a wall thickness of the receiving tube has to be dimensioned in such a manner that undesired deformation or breaking of the receiving tube due to the contact pressure force, in particular when the receiving tube is being heated, is prevented.

For instance, sample carrier means are also known that have bearing protrusions that are reinforced by means of transverse ribs at a receiving tube so as to achieve improved distribution of a contact pressure force on a shell of the receiving tube. However, because of their geometrical shape, these sample carrier means can be produced only elaborately from graphite by machining. Furthermore, a shielding gas is directed at the receiving tube. In this context, it is known for the shielding gas to be directed at the receiving tube along a bearing protrusion through a bore in a bearing seat. There is the disadvantage, however, that a so-called stack effect can occur on the tube furnace device, which leads to an undesired change of the gas flow on the receiving tube. Moreover, heating of the sample carrier means causes the length or dimensions of the receiving tube to change because of thermal expansion, which in turn affects a clamping situation in the bearing means and thus a contact pressure force. These described effects also have an adverse effect on the reproducibility of measuring results.

Hence, the object of the present invention is to propose a tube furnace device that provide more accurate measuring results at reduced cost.

This object is attained by a tube furnace device having the features of claim 1.

The tube furnace device according to the invention for an atomizing furnace, in particular for atomic absorption spectrometry, comprises a sample carrier means and a bearing means for supporting and forming electrical contact with the sample carrier means, the sample carrier means having a receiving tube forming a tubular receiving space for receiving an analyte, the sample carrier means having two bearing protrusions on the receiving tube for forming a connection with the bearing means, the bearing protrusions extending perpendicularly, preferably orthogonally, in relation to a longitudinal axis of the receiving tube, wherein the tube furnace device has a contact pressure means via which a contact pressure force can be exerted on the bearing protrusions in the direction of a passant line in relation to a circular cross section of the receiving tube.

In case of the tube furnace devices known from the state of the art, the contact pressure force is always effected in the radial direction so as to be directed at the longitudinal axis of the receiving tube, the contact pressure force being exerted on the bearing protrusions by the bearing means or by bearing seats of the bearing means. In contrast, it is provided for the tube furnace device according to the invention to have a contact pressure means designed in such a manner that here, too, a contact pressure force is exerted on the bearing protrusions in order to form sufficient electrical contact; however, in relation to a circular cross section of the receiving tube, the contact pressure force is exerted on the bearing protrusions in the direction of a passant line, i.e. past the receiving tube or past the circular cross section. Thus, the sample carrier means can be removably supported on or clamped to the bearing means and can also be provided with electrical contact, without the contact pressure force or a force component of the contact pressure force being directed at the receiving tube. Hence, the receiving tube does not need to have a particularly thick wall or wall thickness or reinforcing ribs for diverting a contact pressure force. The wall thickness of the receiving tube can also be substantially reduced, which allows advantageously reducing a heating time of the receiving tube. Moreover, owing to the absence of reinforcing ribs, the structure of the receiving tube and of the sample carrier means is less elaborate and can thus be produced at lower cost. This is particularly advantageous given the fact that the sample carrier means has to be replaced on a regular basis. Moreover, the contact pressure force will not be directed in the direction of thermal expansion of the receiving tube, which improves the reproducibility of measuring results.

Advantageously, the tube furnace device can be made entirely of graphite. In this case, the tube furnace device can be made of multiple parts, and all parts or individual parts of the tube furnace device can be pyrolytically coated, which allows achieving a longer service life of the tube furnace device and of the sample carrier means in particular.

Furthermore, it may be provided for the receiving tube to be transversally electrically heatable via the bearing protrusions. This allows ensuring temperature consistency across an entire length of the receiving tube.

The bearing protrusion can be composed of a bearing body and a support web, the support web being able to connect the bearing body to the receiving tube. The support web can be formed integrally with the receiving tube, and the bearing body can in turn be formed integrally with the support web. Consequently, the receiving tube can also be made in one piece with both bearing protrusions. The sample carrier means formed in this manner can be produced by machining a graphite body. If the respective bearing bodies and the support web are designed in the manner of a continuous profile in the direction of the longitudinal axis of the receiving tube, production of the sample carrier means is particularly simple because no special geometrical contours, such as reinforcing ribs, have to be formed.

Furthermore, the contact pressure means can have two contact pressure elements, and each contact pressure element can be associated with a bearing protrusion. By means of the contact pressure elements, it is thus possible to apply a contact pressure force to each bearing protrusion independently.

The contact pressure elements can be arranged on the bearing protrusions in such a manner that the contact pressure force can be exerted on the bearing protrusions perpendicularly, preferably orthogonally, in relation to a longitudinal axis of the bearing protrusions. Preferably, the longitudinal axis of the bearing protrusions can extend orthogonally to the longitudinal axis of the receiving tube and intersect the latter. This ensures that the contact pressure force can no longer act directly on the receiving tube, but solely on the bearing protrusions. The contact pressure elements can also be arranged loosely on the bearing protrusions, allowing the sample carrier means to be taken out of the bearing means and be replaced, if necessary, by simply loosening the contact pressure means, depending on whether the contact pressure force is being applied. Moreover, it is possible to provide the bearing protrusions with electrical contact via the contact pressure elements, in particular if the contact pressure elements are not in direct electrical contact with each other or are electrically isolated from each other.

In one contact pressure element, a passage opening may be formed, which can be coaxial with an opening formed in a wall of the receiving tube for receiving an analyte. For example, this allows the analyte to be easily introduced into the opening in the receiving tube and thus into the receiving space through the passage opening in the contact pressure element. The contact pressure element in question will thus also be larger than another contact pressure element. The fact that the contact pressure element is arranged above the receiving tube or above the sample carrier means and covers the receiving tube except for the passage opening leads to advantageous thermal shielding of the receiving tube.

The bearing means can have two bearing seats, and each bearing seat can be associated with a bearing protrusion. The bearing seats can be arranged symmetrically in relation to the longitudinal axis of the receiving tube, in which case, too, one bearing seat can be bigger than another bearing seat, allowing a cover of the receiving tube to be formed below the receiving tube by means of the bearing seat. The bearing seats, in particular, can be designed to provide the bearing protrusions with electrical contact, which means that the bearing seats are not conductively connected to each other, i.e. electrically isolated from each other.

The bearing protrusions can each be arranged between a contact pressure element and a bearing seat. In this way, each bearing protrusion can be received between a contact pressure element and a bearing seat and be provided with electrical contact.

In this context, the respective contact pressure elements and the respective bearing seats can be arranged relative to each other in such a manner that an electrically isolating gap is formed, which electrically separates the respective contact pressure elements and the respective bearing seats from each other. In this way, it also becomes possible to let a current flow through the receiving tube via the bearing protrusions in the perpendicular direction relative to the receiving tube in order to transversally heat the receiving tube. The electrically isolating gap can be formed by a dielectric medium, in particular by air.

In particular owing to the fact that the contact pressure elements and the bearing seats are not directly connected to each other, it becomes possible to design a contact pressure element and its associated bearing seat in such a manner that they form a floating bearing for supporting the sample carrier means. Another contact pressure element and its associated other bearing seat can thus form a fixed bearing for supporting the sample carrier means. In principle, however, the tube furnace device can also have two floating bearings. By forming the floating bearing, it becomes possible to allow for thermal expansion and changes in length of the sample carrier means perpendicularly to the longitudinal axis of the receiving tube without the receiving tube being subjected to a force potentially deforming the receiving tube because of the change in length.

The bearing protrusions and the bearing seats can each form a contact surface pair with a bearing surface of a bearing protrusion and a seat surface of a bearing seat. Consequently, the bearing surface of the bearing protrusion rests against the seat surface of the bearing seat, allowing the sample carrier means to be supported and provided with electrical contact via the contact surface pair under the effect of the contact pressure force.

The contact surface pair can be realized in such a manner that a force action of the contact pressure force on the receiving tube is avoided. Depending on the arrangement and design of the contact surface pair, the contact pressure force or a force component of the contact pressure force can be prevented from acting on the receiving tube. In a particularly simple embodiment, the contact surface pairs are arranged in a shared contact surface plane, through which the longitudinal axis of the receiving tube extends.

The seat surface can also have two partial surfaces, of which a first partial surface can be parallel and a second partial surface can be perpendicular to an effective direction of the contact pressure force, a force component of the contact pressure force being exertable on the first partial surface via the second partial surface. Optionally, it is also possible for both partial surfaces to be perpendicular to an effective direction of the contact pressure force, the partial surfaces being arranged in a V-shape in relation to a vertical plane or to the passant line, for example. In both cases, it is possible to exert the contact pressure force on the partial surfaces in their effective direction across the partial surfaces in such a manner that the bearing protrusions or respective partial surfaces of the bearing seat are pressed against the partial surfaces of the seat surface. It thus becomes possible, on the one hand, to tightly fix the bearing protrusions to the respective bearing seats and, on the other hand, to establish a reliable electrical contact at the same time.

Furthermore, the tube furnace device can comprise a gas conducting means for forming a gas flow onto the receiving tube. If a gas flow directed straight at the receiving tube is formed by means of the gas conducting device, it becomes possible to avoid the stack effect known from the state of the art, allowing the formation of a more constant supply of shielding gas to the receiving tube and thus also a higher temperature consistency of the receiving tube due to a potential cooling effect of the gas flow.

Each bearing seat can form a gas duct of the gas conducting means. Thus, the gas or shielding gas can be led to the sample carrier means via the bearing seats. The gas duct can be a simple passage bore.

The bearing protrusions can have passage bores of the gas conducting means, which can extend in the direction toward the receiving tube. A plurality of passage bores can be formed on the bearing protrusions, such as in rows above and below the longitudinal axis of the receiving tube. The gas can be supplied to the passage bores via a gas duct of the gas conducting means. Passage bores of this kind in the bearing protrusions are easy to produce and ensure an even distribution of the gas and the flow onto the receiving tube.

Furthermore, the passage bores can be connected to the respective gas duct in a sealing manner via the contact surface pair. In particular if sufficient surface pressure of the contact surface pair can be achieved via the contact pressure force, the bearing surface can be in sealing contact with the seat surface, allowing the respective gas to be advantageously supplied to the passage bores.

The bearing seats can each be formed by a connecting pin for connecting the tube furnace device to a tube furnace seat of an atomizing furnace. With the respective connecting pin, the bearing seats and basically the entire tube furnace device can thus be supported on the tube furnace seats of the atomizing furnace. Power and gas can also be supplied via the connecting pins. The connecting pins can be realized as connecting pins known from the state of the art so that known sample carrier means can be simply replaced with the tube furnace device according to the invention.

The tube furnace device can comprise a cover means for covering longitudinal ends of the sample carrier means, and the cover means can be composed of plate-shaped cover elements having a passage opening coaxial with the receiving tube. By means of the plate-shaped cover elements, a housing-type cover of the sample carrier means can thus be created, through which a supply of shielding gas to the receiving tube and, in part, heat insulation can be established. By means of the passage opening it still remains possible to optically measure an analyte in the receiving space because the passage opening is preferably as large as a diameter of the receiving space or larger.

An analyzing apparatus, in particular for atomic absorption spectrometry, can comprise an atomizing furnace, the atomizing furnace having a tube furnace device according to the invention. Other embodiments of an analyzing apparatus become apparent from the dependent claims referring back to device claim 1.

Hereafter, a preferred embodiment of the invention will be explained in more detail with reference to the accompanying drawings.

BRIEF DESCRIPTION OF THE DRAWING FIGURES

In the drawings:

FIG. 7 shows a top view of the sample carrier means;

FIG. 8 shows a perspective view of the sample carrier means;

FIG. 9 shows a perspective view of the bearing means; and

Figure 1:
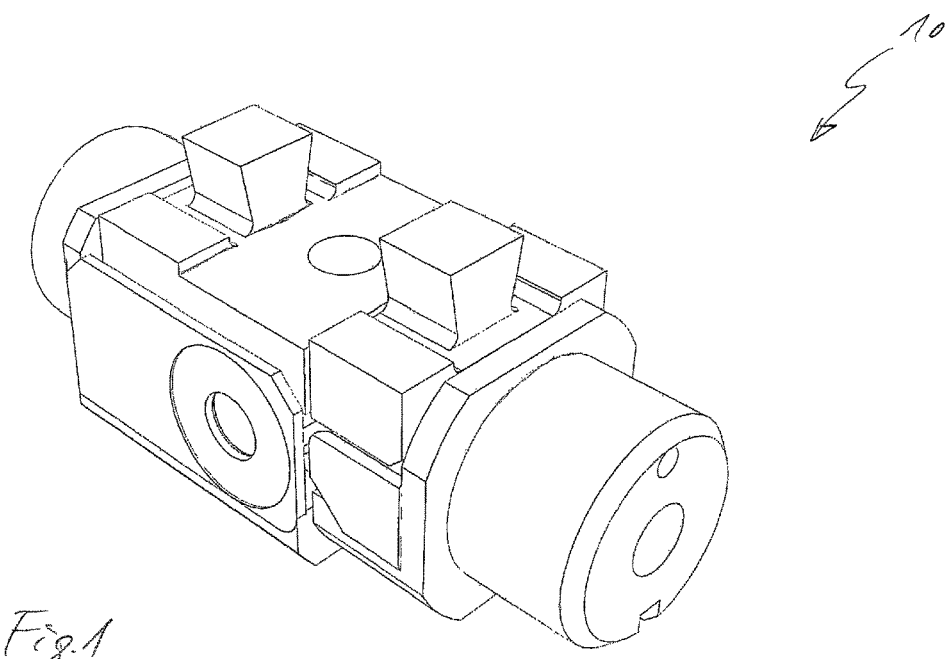
FIG. 1 shows a perspective view of a tube furnace device.
Figure 2:
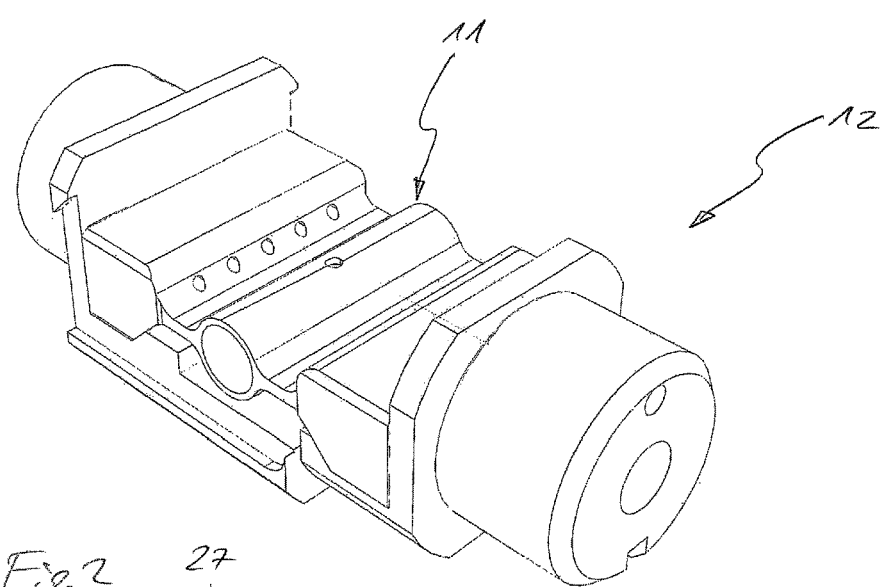
FIG. 2 shows a perspective partial view of a tube furnace device.
Figure 3:
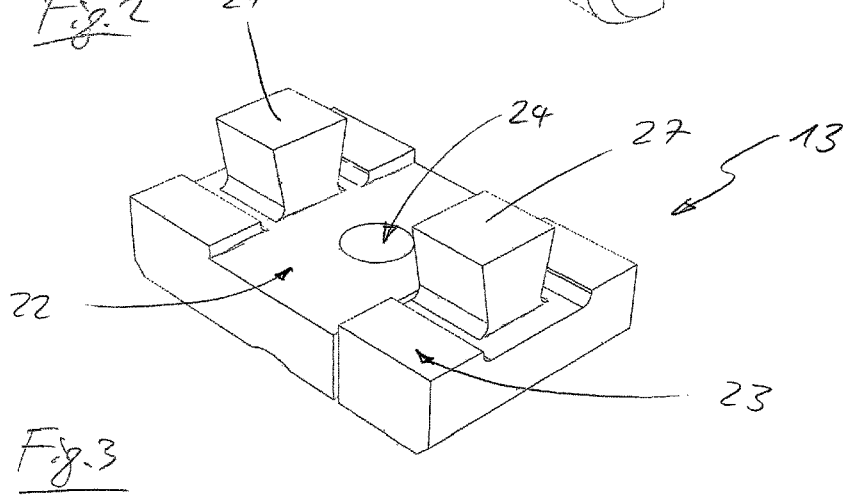
FIG. 3 shows a perspective view of a contact pressure means.
Figure 4:
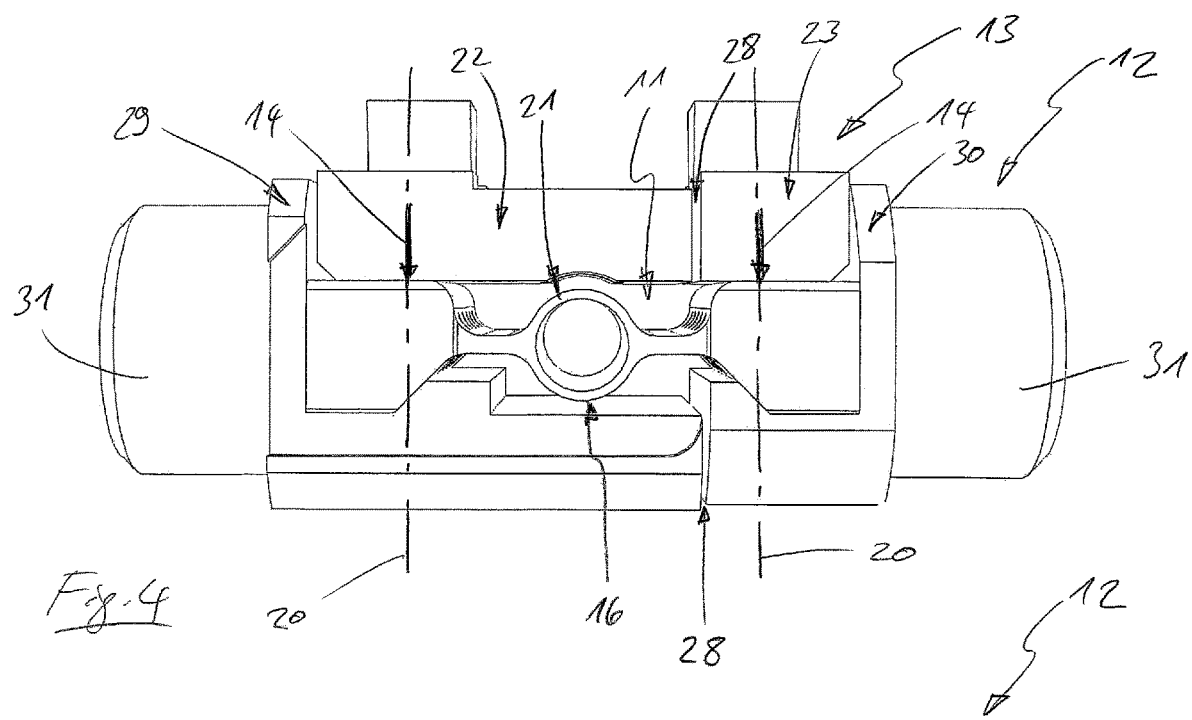
FIG. 4 shows a front view of the tube furnace device.
Figure 5:
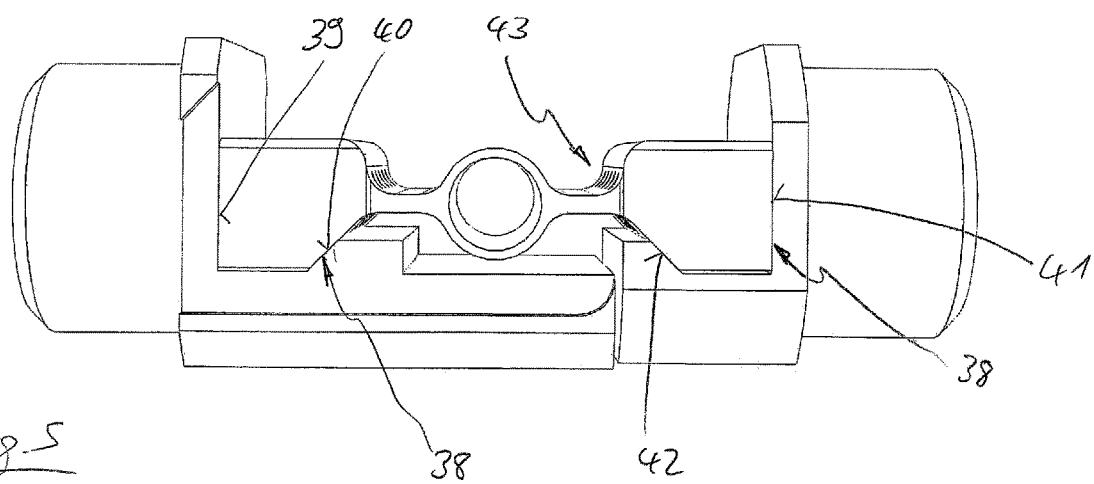
FIG. 5 shows a front view of a sample carrier means and of a bearing means.
Figure 6:
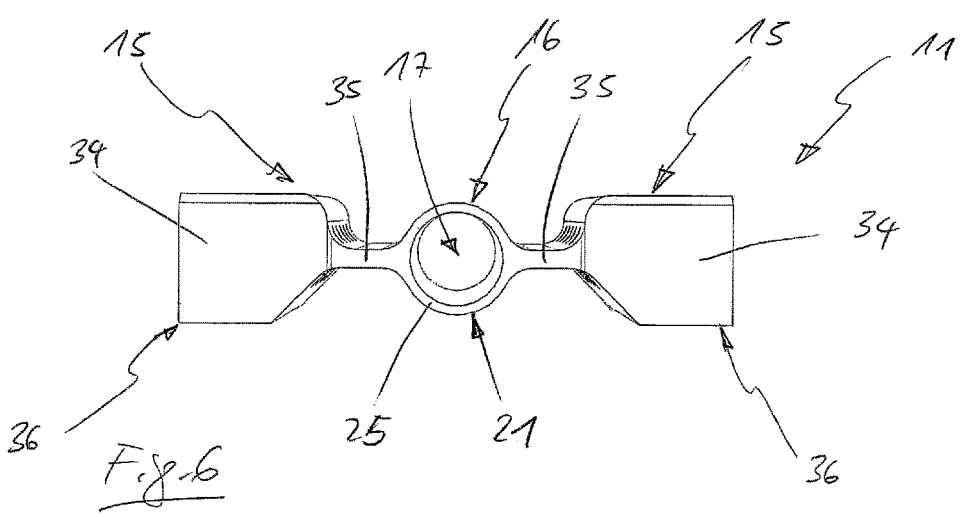
FIG. 6 shows a front view of the sample carrier means.
Figure 10:
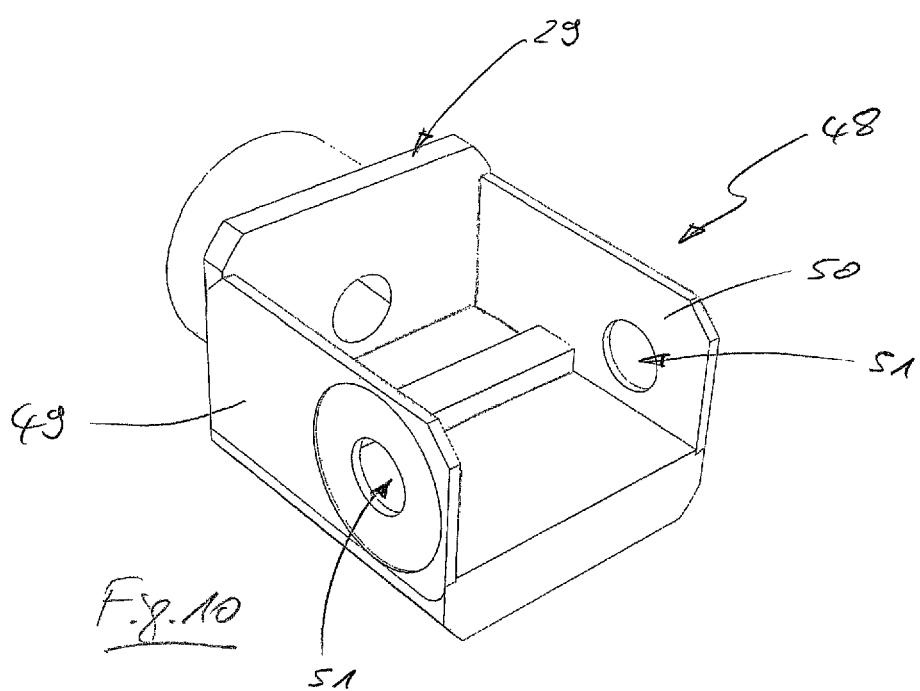
FIG. 10 shows a perspective partial view of the tube furnace device.

A combined view of FIGS. 1 to 10 shows a tube furnace device 10 and its components in different views. The tube furnace device 10 is made entirely of graphite and configured for use in an atomizing furnace, in particular for atomic absorption spectrometry. The tube furnace device 10 comprises a sample carrier means 11, a bearing means 12 for supporting and forming electrical contact with the sample carrier means 11, and a contact pressure means 13, via which a contact pressure force, which is denoted by arrows 14, can be exerted on bearing protrusions 15 of the sample carrier means 11.

The sample carrier means 11 further has a receiving tube 16, which forms a tubular receiving space 17 for receiving an analyte (not illustrated), bearing protrusions 15 being integrally formed on the receiving tube 16. In the case at hand, the bearing protrusions 15 extend orthogonally to a longitudinal axis 18 of the receiving tube 16, another longitudinal axis 19 of the bearing protrusions 15 orthogonally intersecting the longitudinal axis 18. The contact pressure means 13 is in particular arranged and configured in such a manner that the contact pressure force can be exerted on the bearing protrusions 15 in the direction of a passant line 20 in relation to a circular cross section 21 of the receiving tube 16.

The contact pressure means 13 has two contact pressure elements 22 and 23, a passage opening 24 being formed in contact pressure element 22, said passage opening 24 being coaxial with a bore 26 formed in a wall 25 of the receiving tube 16 for supplying an analyte. Contact pressure element 22 is larger than contact pressure element 23 and substantially covers the sample carrier means 11 toward the top. On each of the contact pressure elements 22 and 23, a contact pressure pin 27 is integrally formed, via which the contact pressure force can be introduced in each case. Furthermore, the contact pressure elements 22 and 23 are arranged at a distance from each other by way of a gap 28 in such a manner that they are electrically isolated from each other.

The bearing means 12 has two bearing seats 29 and 30, which are also spaced apart from each other by way of the gap 28. On each of the bearing seats 29 and 30, a connecting pin 31 is integrally formed, via which the bearing seats 29 and 30 can be connected to a tube furnace seat (not illustrated) of an atomizing furnace. A gas duct 32 in the shape of a straight passage bore 33 is formed in each of the bearing seats 29 and 30. Bearing seat 29, in particular, is larger than bearing seat 30, bearing seat 29 covering the sample carrier means 11 toward the bottom, thus thermally shielding it.

The bearing protrusions 15 of the sample carrier means 11 are each composed of a bearing body 34 and a plate-shaped support web 35, the support web 35 connecting the bearing body 34 to the receiving tube 16 in each case. On the bearing body 34, a bearing surface 36 is formed, which is placed against a seat surface 37, which is formed by one of the bearing seats 29 and 30 in each case. A thus formed contact surface pair 38 allows forming an electrically conductive connection between the sample carrier means 11 and the bearing means 12. In particular, the seat surface 37 has a first partial surface 39 and a second partial surface 40, the first partial surface 39 being parallel to an effective direction of the contact pressure force and the second partial surface 40 being perpendicular to said effective direction, which is denoted by arrow 14. By arranging the second partial surface 40 at an angle of 45° in relation to the effective direction of the contact pressure force, a force component (not illustrated) of the contact pressure force is effected which exerts a force component on the first partial surface 39 via the bearing body 34. Accordingly, a first partial bearing surface 41 of the bearing surface 36 is in contact with the first partial surface 39 and a second partial bearing surface 42 is in contact with the second partial surface 40.

In each of the bearing bodies 34, a gas conducting device 43 is formed by way of passage bores 44 in the direction of the other longitudinal axis 19. Each passage bore 44 is in communication with a respective passage bore 33 via a distribution chamber 45 of the gas conducting means 43, the force component of the contact pressure force pressing the first partial surface 39 in a sealing manner against the first partial bearing surface 41 so that a shielding gas can flow through the gas duct 32 into the distribution chamber 45 and subsequently through the passage bores 44 and in a directed manner onto the receiving tube 16. Thus, undesired eddies of the shielding gas or a stack effect can be avoided. Coming from the distribution chamber 45, the passage bores 44 are arranged in an upper row 46, in which they end above the support web 35, and in a lower row 47, in which they end below the support web 35. The shielding gas can thus advantageously flow around the receiving tube 16. Furthermore, a cover means 48 of the tube furnace 10 is provided, which is composed of two plate-shaped cover elements 49 and 50, a passage opening 51 being formed in each of the cover elements 49 and 50, which is coaxial with the receiving tube 16. Accordingly, the passage openings 51 are arranged immediately next to longitudinal ends 52 of the receiving tube 15.

Owing to the fact that the contact pressure means 13 in connection with the contact surface pair 38 does not exert radial pressure on the receiving tube 16, the circular cross section 21 of the receiving tube 16 can be particularly thin-walled and dimensionally stable at the same time. This allows achieving better analytical results and higher heating rates. At the same time, an external gas flow can be applied in a targeted manner via the passage bores 44 and be optimized, which also allows improved analytical results. In order to compensate potential thermal expansion of the sample carrier means 11, it may be envisaged to realize the contact pressure element 22 in connection with bearing seat 29 and/or the contact pressure element 23 in connection with bearing seat 30 via the atomizing furnace (not illustrated) and/or to realize the manner of support of the connecting pins 31 as a floating bearing.

The invention claimed is:

1. A tube furnace device (10) for an atomizing furnace, in particular for atomic absorption spectrometry, the tube furnace device comprising a sample carrier (11) and a bearing (12) for supporting and forming electrical contact with the sample carrier, the sample carrier having a receiving tube (16) forming a tubular receiving space (17) for receiving an analyte, the sample carrier having two bearing protrusions (15) on the receiving tube for forming a connection with the bearing, the bearing protrusions extending perpendicularly in relation to a longitudinal axis (18) of the receiving tube, characterized in that the tube furnace device has a contact pressure (13) via which a contact pressure force (14) is exerted on the bearing protrusions in the direction of a passant line (20) in relation to a circular cross section (21) of the receiving tube;

wherein the contact pressure (13) has two contact pressure elements (22, 23), each contact pressure element being associated with one bearing protrusion (15) and the bearing (12) has two bearing seats (29, 30), each bearing seat being associated with one bearing protrusion (15).

2. The tube furnace device according to claim 1, characterized in that the tube furnace device (10) is made entirely of graphite.

3. The tube furnace device according to claim 1, characterized in that the receiving tube (16) is transversally electrically heated via the bearing protrusions (15).

4. The tube furnace device according to claim 1, characterized in that the bearing protrusion (15) is composed of a bearing body (34) and a support web (35), the support web connecting the bearing body to the receiving tube (16).

5. The tube furnace device according to claim 1, characterized in that the contact pressure elements (22, 23) are arranged on the bearing protrusions (15) in such a manner that the contact pressure force (14) is exerted perpendicularly on the bearing protrusions in relation to a longitudinal axis (19) of the bearing protrusions.

6. The tube furnace device according to claim 1, characterized in that a passage opening (24) is formed in one contact pressure element (22), the passage opening being coaxial with an opening (26) formed in a wall (25) of the receiving tube (16) for receiving an analyte.

7. The tube furnace according to claim 1, characterized in that each bearing protrusion (15) is arranged between a contact pressure element (22, 23) and a bearing seat (29, 30).

8. The tube furnace device according to claim 1, characterized in that the respective contact pressure elements (22, 23) and the respective bearing seats (29, 30) are arranged in relation to each other in such a manner that an electrically isolating gap (28) is formed.

9. The tube furnace device according to claim 1, characterized in that a contact pressure element (22, 23) and the associated bearing seat (29, 30) together form a floating bearing for supporting the sample carrier (11).

10. The tube furnace device according to claim 1, characterized in that the bearing protrusions (15) and the bearing seats (29, 30) each form a contact surface pair (38) with a bearing surface (36) of a bearing protrusion (15) and a seat surface (37) of a bearing seat (29, 30).

11. The tube furnace device according to claim 10, characterized in that the contact surface pair (38) is formed in such a manner that a force action of the contact pressure force (14) on the receiving tube (16) is avoided.

12. The tube furnace according to claim 10, characterized in that the seat surface (37) has two partial surfaces, a first partial surface (39) being parallel and a second partial surface (40) being perpendicular to an effective direction of the contact pressure force (14), a force component of the contact pressure force being exertable on the first partial surface via the second partial surface.

13. The tube furnace device according to claim 10, characterized in that the tube furnace device (10) comprises a gas conductor (43) for forming a gas flow onto the receiving tube (16).

14. The tube furnace device according to claim 13, characterized in that the bearing seats (29, 30) each form a gas duct (32) of the gas conductor (43).

15. The tube furnace device according to claim 13, characterized in that the bearing protrusions (15) have passage bores (44) of the gas conductor (43) which extend in the direction of the receiving tube (16).

16. The tube furnace device according to claim 15, characterized in that the passage bores (44) are connected to the respective gas duct (32) in a sealing manner via the contact surface pair (38).

17. The tube furnace device according to claim 1, characterized in that the bearing seats (29, 30) each have a connecting pin (27) for connecting the tube furnace device (10) to a tube furnace seat of an atomizing furnace.

18. The tube furnace according to claim 1, characterized in that the tube furnace device (10) comprises a cover (48) for covering longitudinal ends (52) of the sample carrier (11), the cover being composed of plate-shaped cover elements (49, 50) having a passage opening (51) arranged coaxially with the receiving tube (16).

* * * * *